US011604038B2

(12) United States Patent
Jorgensen et al.

(10) Patent No.: US 11,604,038 B2
(45) Date of Patent: Mar. 14, 2023

(54) HEAT EXCHANGER TUBE PLUG

(71) Applicant: JNT Technical Services, Inc., Little Ferry, NJ (US)

(72) Inventors: Glenn F. Jorgensen, Little Ferry, NJ (US); Ryan J. Jorgensen, Little Ferry, NJ (US)

(73) Assignee: JNT Technical Services, Inc., Little Ferry, NJ (US)

( * ) Notice: Subject to any disclaimer, the term of this patent is extended or adjusted under 35 U.S.C. 154(b) by 0 days.

(21) Appl. No.: 17/195,986

(22) Filed: Mar. 9, 2021

(65) Prior Publication Data
US 2022/0290931 A1    Sep. 15, 2022

(51) Int. Cl.
| F28F 11/02 | (2006.01) |
| F16L 55/11 | (2006.01) |
| F16L 55/132 | (2006.01) |
| F16L 55/136 | (2006.01) |

(52) U.S. Cl.
CPC .......... *F28F 11/02* (2013.01); *F16L 55/1108* (2013.01); *F16L 55/1125* (2013.01); *F16L 55/1141* (2013.01); *F16L 55/132* (2013.01); *F16L 55/136* (2013.01)

(58) Field of Classification Search
CPC .... F16J 13/12; F16L 55/1108; F16L 55/1125; F16L 55/1141; F16L 55/128; F16L 55/1286; F16L 55/132; F16L 55/136; F28F 11/02
USPC .......... D23/260; 138/89; 220/234, 235, 237; 411/26, 35, 37, 60.1, 60.2, 75, 78, 80
See application file for complete search history.

(56) References Cited

U.S. PATENT DOCUMENTS 2,245,887 A * 6/1941 Wikander ............. F16L 55/132
4/295
3,135,414 A * 6/1964 Lee, II ..................... F16J 13/02
220/235

(Continued)

OTHER PUBLICATIONS

JNT Technical Services. "Refinery finds method to seal and secure leaking tubes in heat exchangers", BIC Magazine [online], Feb. 19, 2021, [retrieved on Mar. 22, 2022], Retrieved from the Internet: <URL: https://www.bicmagazine.com/resources/sponsored-content/Refinery-finds-method-to-seal-and-secure/> (Year: 2021).*

*Primary Examiner* — Robert K Arundale
*Assistant Examiner* — Richard K. Durden
(74) *Attorney, Agent, or Firm* — David Nocilly (57) ABSTRACT

A heat exchange plug that plugs the aperture of a tubesheet with a leaking tube while also securing the tube against movement that could damage other tubes of the tubesheet. A cylindrical housing member with two different diameter body section can be inserted so that the wider diameter section is positioned in the aperture of the tubesheet and the smaller diameter section is located in the tube. An eccentric ring at the end of the housing member can engage the tube and prevent rotation as an insert member is advanced into the rear of the housing member via a threaded shank of the insert member that engages a threaded inner bore of the housing member. A ramped surface of the housing member deforms the wall of the larger diameter section of the housing member outwardly to plug the aperture while the smaller diameter section secures the tube in place.

6 Claims, 7 Drawing Sheets

(56) References Cited

U.S. PATENT DOCUMENTS

| | | | | |
|---|---|---|---|---|
| 3,156,373 A * | 11/1964 | Willis | F41A 17/44 220/237 |
| 3,333,724 A * | 8/1967 | Croft | F16L 55/136 220/237 |
| 3,837,522 A * | 9/1974 | Lesnansky, Jr. | B65D 39/12 411/929 |
| 4,237,937 A * | 12/1980 | Healy, Sr. | F16L 55/11 165/76 |
| 4,310,029 A * | 1/1982 | Dudek | F16L 55/132 215/360 |
| 4,653,540 A * | 3/1987 | Epstein | F16L 55/13 165/71 |
| 4,723,578 A * | 2/1988 | Mordarski | F28F 11/02 29/447 |
| 4,967,468 A * | 11/1990 | Vossbrinck | B23P 19/025 29/890.038 |
| 5,289,851 A * | 3/1994 | Jorgensen | F16L 55/1108 220/234 |
| 5,664,901 A * | 9/1997 | Mayr | F16B 37/122 411/181 |
| 6,170,530 B1 * | 1/2001 | Steblina | F16L 55/132 138/90 |
| 6,450,745 B2 * | 9/2002 | Wieser | F16B 37/122 411/181 |
| 6,883,547 B1 * | 4/2005 | Jorgensen | F16L 55/13 220/234 |
| 6,981,524 B2 * | 1/2006 | Jorgensen | F16L 55/1108 29/523 |
| 9,249,916 B2 * | 2/2016 | Jorgensen | F16L 55/1108 |
| 9,482,476 B2 * | 11/2016 | Al-Otaibi | F16L 55/13 |
| 9,518,790 B2 * | 12/2016 | Jorgensen | F16L 55/1108 |
| 9,664,588 B2 * | 5/2017 | Kotlyar | F16L 55/1283 |
| 10,578,238 B2 * | 3/2020 | Jorgensen | F16L 55/1108 |
| 10,876,669 B2 * | 12/2020 | Liekens | F16L 55/1108 |

* cited by examiner

HEAT EXCHANGER TUBE PLUG

BACKGROUND OF THE INVENTION

1. Field of the Invention

The present invention relates to a plug used to remedy a leaking tube of a heat exchanger and, more particularly, to a heat exchanger tube plug that can seal a tubesheet aperture associated with an individual tube while additionally providing structural support for the tube.

2. Description of the Related Art

In the construction of boilers and other heat exchange equipment, such as those used in the power generation and chemical industries, there is often a need to seal leaking tubes, pipes and similar conduits that transport steam, liquid or gasses under pressure. This sealing is frequently accomplished by the insertion of a plug into the tube. For example, Applicant has disclosed several such plugs in U.S. Pat. Nos. 5,289,851, 6,883,547, and 6,981,524 that, upon insertion, will expand to sealingly engage the inner surface of a boiler or heat exchanger tube.

However, in certain equipment, such as fin fan exchangers, direct access to the tubes is limited on the tubesheet side and a leaking tube is often damaged to the point that the tube end needs to be removed. Thus, even if the tube is plugged, the tube can become separated from the tubesheet because only a small portion of the tube, if any, remains securely connected to the tubesheet. As a result, a conventionally plugged tube can become dislodged and damage adjacent tubes, thereby compromising the integrity of the entire fin fan exchanger. Accordingly, there is a need in the art for an approach that can plug a leaking tube and support the tube in the appropriate location to prevent the tube from damaging other tubes in the heat exchanger.

BRIEF SUMMARY OF THE INVENTION

The present invention is a heat exchange plug that can plug the aperture of a tubesheet associated with a leaking tube and secure the tube against movement that could damage other tubes associated with the tubesheet. More specifically, the heat exchanger tube plug comprises a housing member including a first cylindrical body having a deformable wall of a first outer diameter surrounding a first inner bore of a first inner diameter. The housing member has a second cylindrical body of a second outer diameter surrounding a second, threaded inner bore of a second inner diameter. The first outer diameter is dimensioned to fit within an aperture of a tubesheet, and is larger than the second outer diameter with is dimensioned to fit within a tube of the tube sheet. An eccentric ring is rotatably mounted to an eccentric post extending axially from a front end of the housing body to engage the inside of the tube and prevent rotation of the housing member. The present invention further comprises an insert member having a threaded shank corresponding to the second, threaded inner bore. The insert member has a ramped surface positioned to deform the deformable wall outwardly when the first threaded shank is advanced into the first inner bore. The insert member has a driving recess positioned oppositely from the threaded shank so that a user can rotate the insert member relative to the housing member, thereby causing the deformable wall to expand and plug the aperture while the second cylindrical body secures the tube in place.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
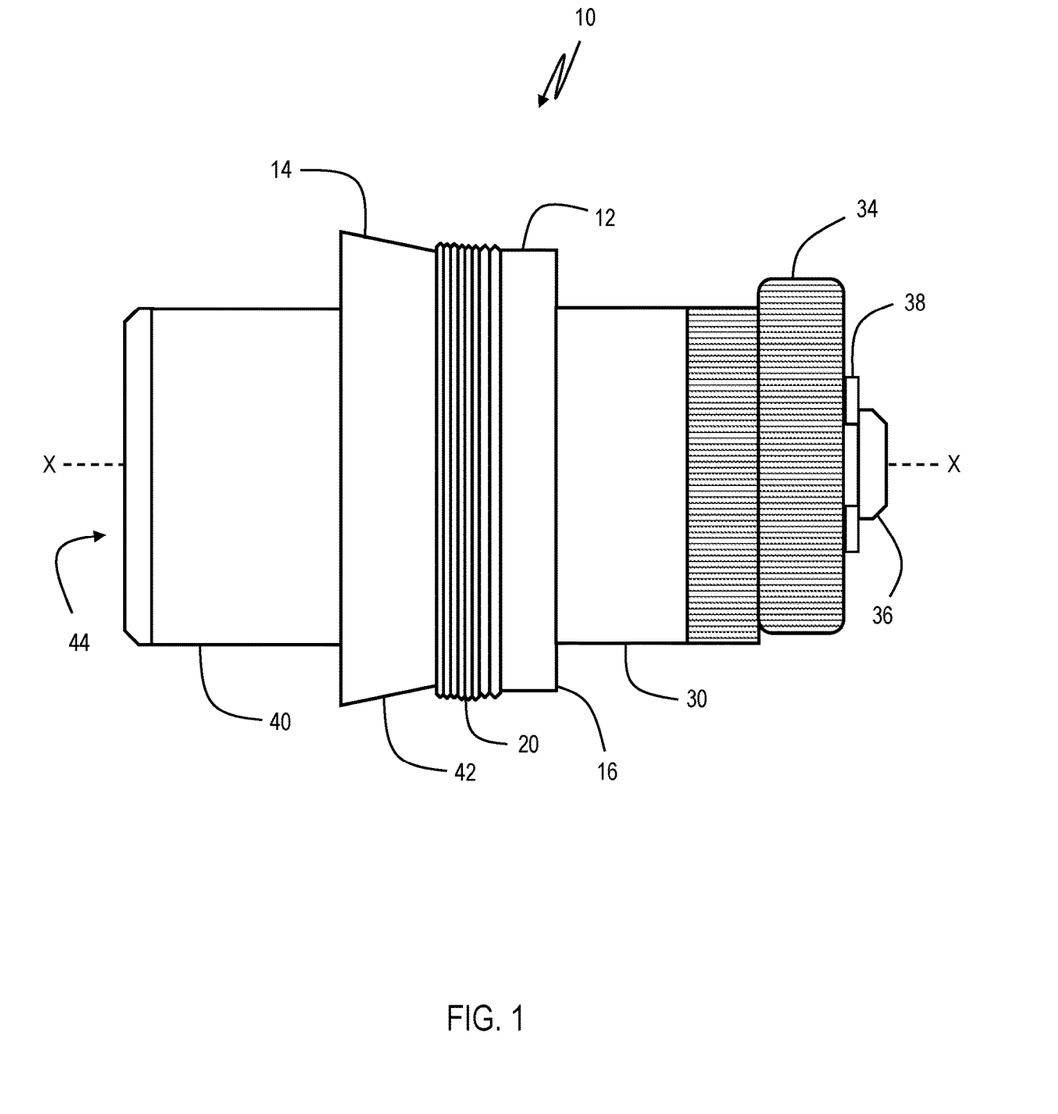
FIG. 1 is a side view of a heat exchanger tube plug according to the present invention.
Figure 2:
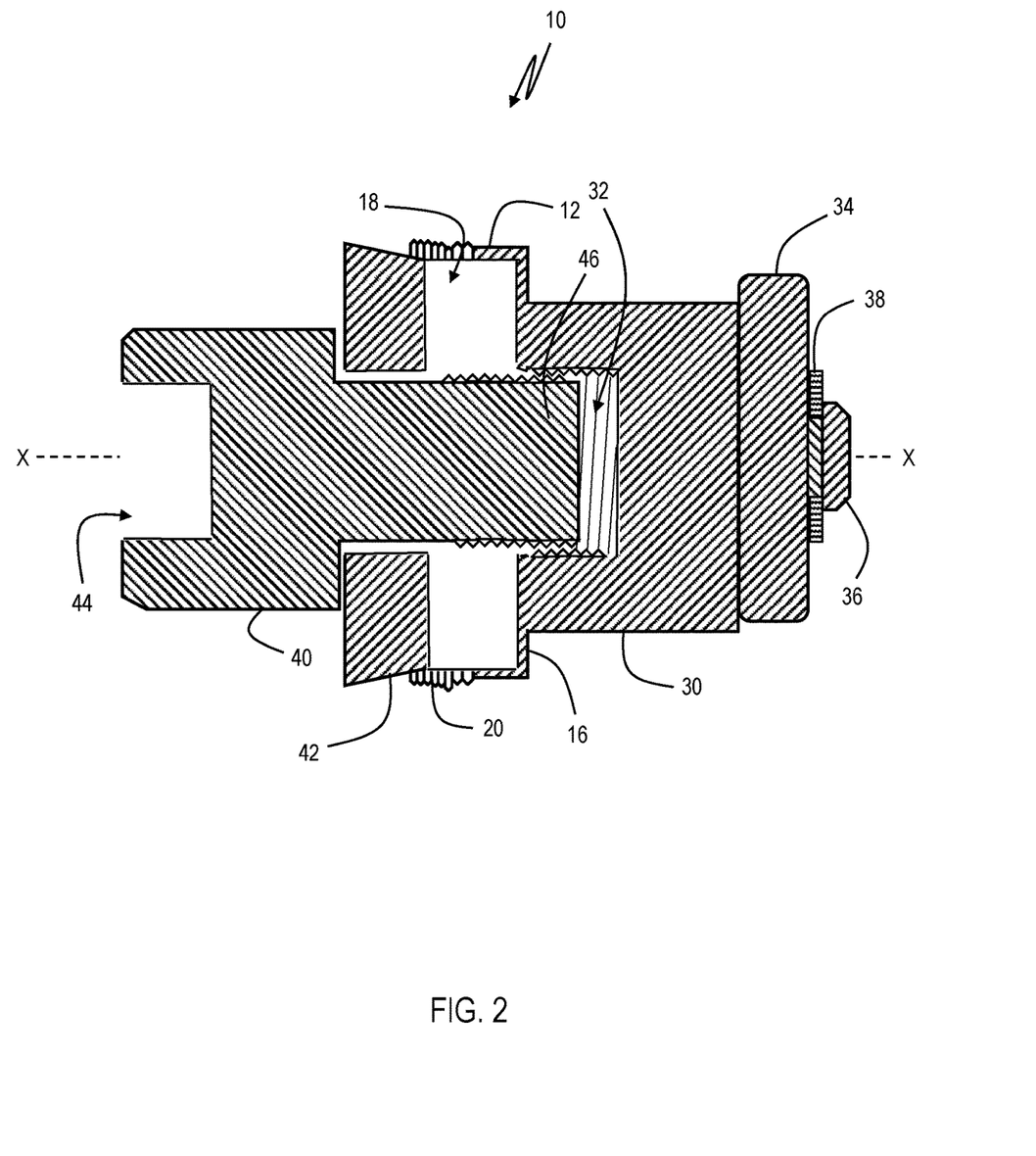
FIG. 2 is a cross-sectional view of a heat exchanger tube plug according to the present invention
Figure 3:
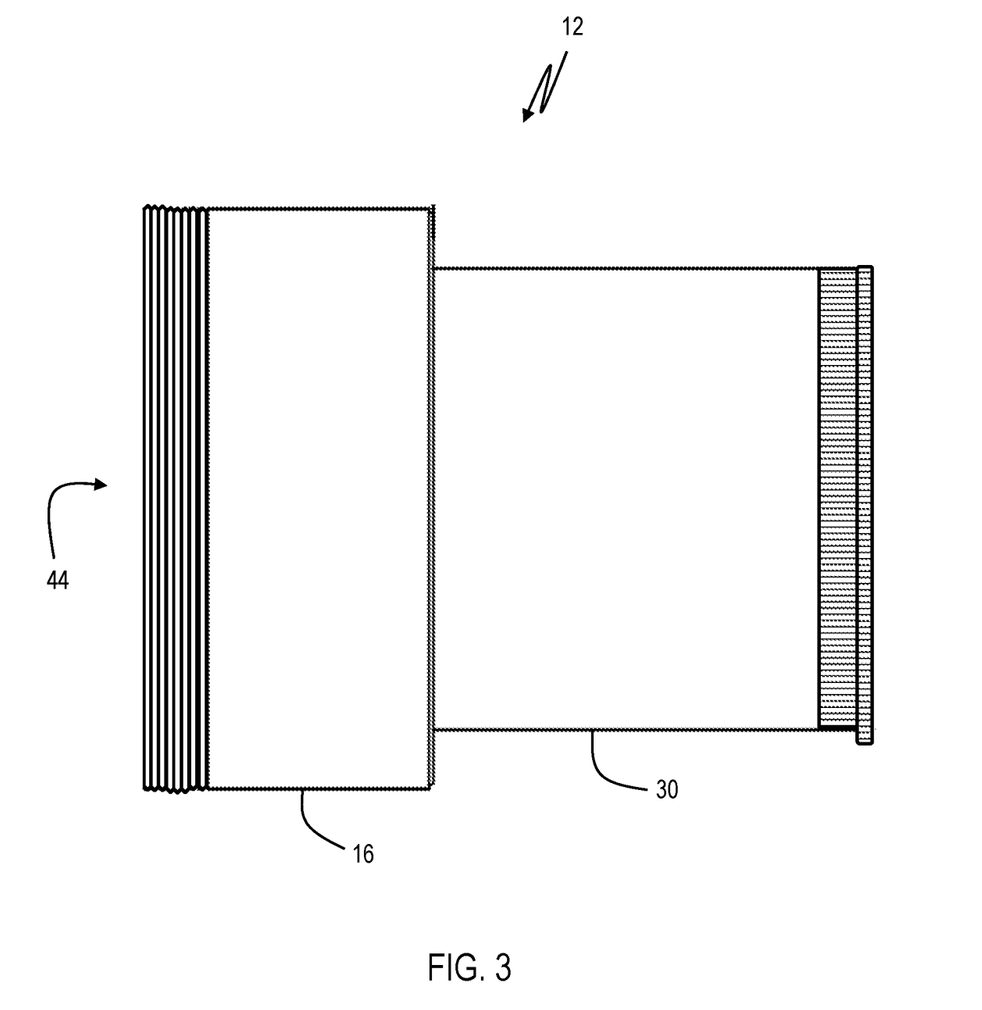
FIG. 3 is a side view of a housing member for a heat exchanger tube plug according to the present invention.
Figure 4:
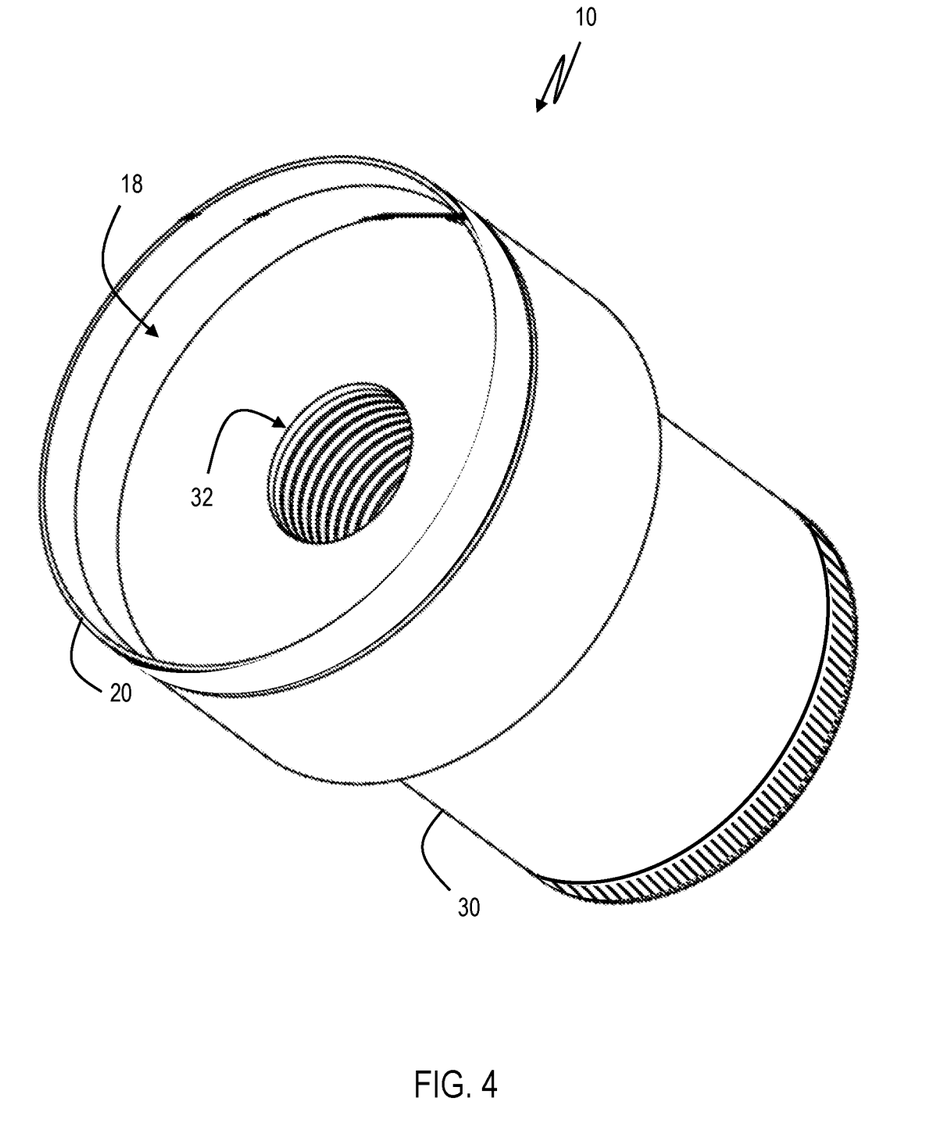
FIG. 4 is a perspective view of a housing member for a heat exchanger tube plug according to the present invention.
Figure 5:
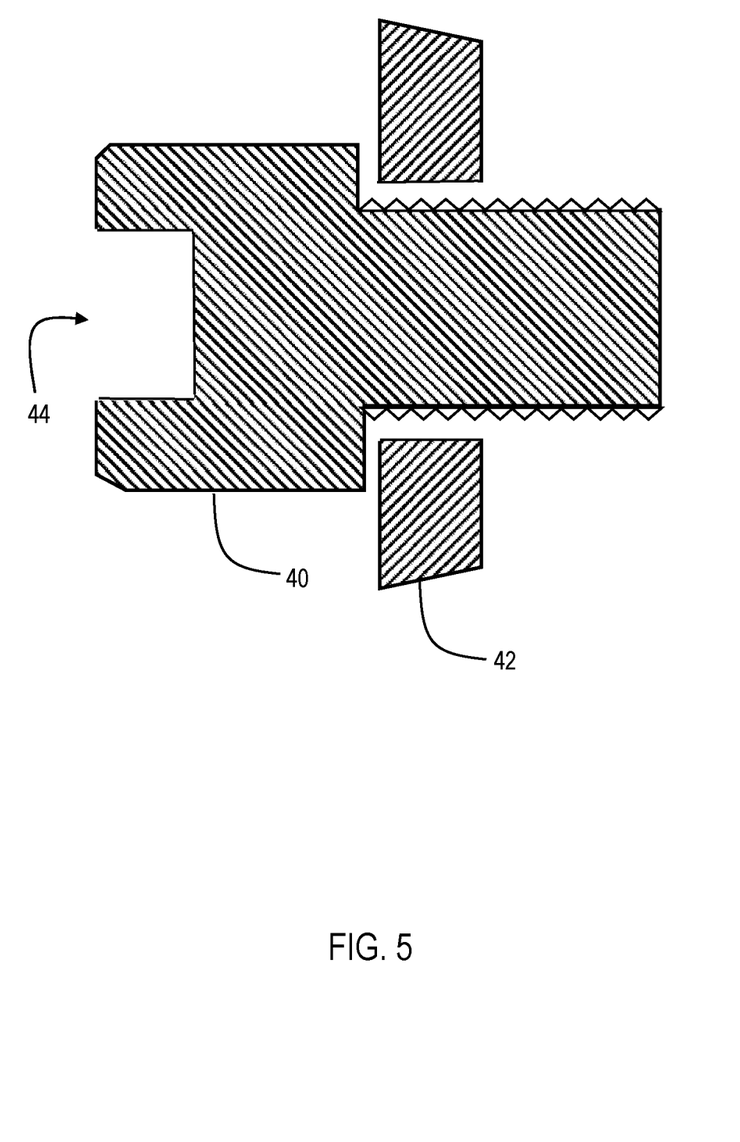
FIG. 5 is a side view of an insert member for a heat exchanger tube plug according to the present invention.

Referring to the figures, wherein like numeral refer to like parts throughout, there is seen in FIG. 1 a heat exchanger tube plug 10 made in accordance with the present invention. Plug 10 comprises a housing member 12 and an insert member 14 that can be advanced into housing member 12. Housing member 12 has first cylindrical body 16, the rear portion of which is formed with a large open bore 18. Bore 18 is surrounded by relatively thin wall 20 that is deformable and will expand outwardly to provide a seal with a cylindrical opening, such as the aperture of a tube sheet in response to advancement of insert member 14 into bore 18. For example, as seen in FIG. 1, wall 20 may be serrated or textured to encourage deformation. Housing member 12 includes a second cylindrical body 30 positioned on the opposing side of first cylindrical body 16 from bore 18. Second cylindrical body 30 has a smaller diameter than first cylindrical body 16 and includes a threaded bore 32 therein that is smaller than bore 18 and is in communication with bore 18. First cylindrical body 16 is dimensioned to fit securely within the aperture of a tube sheet with second cylindrical body 30 extending into the tube that is associated with that aperture of the tube sheet. Housing member 12 thus has a stepped design with the larger portion dimensioned to fit in the aperture of the tubesheet and the smaller portion fitting in the tube to be sealed.

Housing member 12 includes an eccentric assembly 34 coupled to the end of second cylindrical body 30 so that second cylindrical body 30 is locked against rotation when second cylindrical body 30 and eccentric assembly 34 are inserted through an aperture of a tubesheet and then into the tube associated with the aperture of the tubesheet. For example, eccentric assembly 34 may comprise a cylindrical post 36 that extends axially from second cylindrical body 30, and a ring member 38 mounted eccentrically to post 36 relative to a longitudinal axis X-X of housing member 12 and rotatable thereon.

Insert member 14 comprises a head 40 and a tapered ferrule 42, which is preferably frustoconical. Head 40 preferably includes a driving recess 44 formed therein, such as a hex socket head manual rotation of insert member 14 using a hex driver, but other coupling approaches may be used. Ferrule 42 is dimensioned to fit inside the aperture of a about the same as the inner diameter of tubesheet aperture 52) and second cylindrical body 30 would depend on the inner diameter of the particular tube 54. Exemplary dimensions common in the field are listed in Table A below:

TABLE A

| BWG | Wall Thickness (inches) | Tube Outside Diameter (inches) | | | | | | | | |
|---|---|---|---|---|---|---|---|---|---|---|
| | | 0.500 | 0.625 | 0.750 | 0.875 | 1.000 | 1.250 | 1.500 | 1.750 | 2.000 |
| 10 | 0.134 | 0.232 | 0.357 | 0.482 | 0.607 | 0.732 | 0.982 | 1.232 | 1.482 | 1.732 |
| 11 | 0.120 | 0.260 | 0.385 | 0.510 | 0.635 | 0.760 | 1.010 | 1.260 | 1.510 | 1.760 |
| 12 | 0.109 | 0.282 | 0.407 | 0.532 | 0.657 | 0.782 | 1.032 | 1.282 | 1.532 | 1.782 |
| 13 | 0.095 | 0.310 | 0.435 | 0.560 | 0.685 | 0.810 | 1.060 | 1.310 | 1.560 | 1.810 |
| 14 | 0.083 | 0.334 | 0.459 | 0.584 | 0.709 | 0.834 | 1.084 | 1.334 | 1.584 | 1.834 |
| 15 | 0.072 | 0.356 | 0.481 | 0.606 | 0.731 | 0.856 | 1.106 | 1.356 | 1.606 | 1.856 |
| 16 | 0.065 | 0.370 | 0.495 | 0.620 | 0.745 | 0.870 | 1.120 | 1.370 | 1.620 | 1.870 |
| 17 | 0.058 | 0.384 | 0.509 | 0.634 | 0.759 | 0.884 | 1.134 | 1.384 | 1.634 | 1.884 |
| 18 | 0.049 | 0.402 | 0.527 | 0.652 | 0.777 | 0.902 | 1.152 | 1.402 | 1.652 | 1.902 |
| 19 | 0.042 | 0.416 | 0.541 | 0.666 | 0.791 | 0.916 | 1.166 | 1.416 | 1.666 | 1.916 |
| 20 | 0.035 | 0.430 | 0.555 | 0.680 | 0.805 | 0.930 | 1.180 | 1.430 | 1.680 | 1.930 |
| 21 | 0.032 | 0.436 | 0.561 | 0.686 | 0.811 | 0.936 | 1.186 | 1.436 | 1.686 | 1.936 |
| 22 | 0.028 | 0.444 | 0.569 | 0.694 | 0.819 | 0.944 | 1.194 | 1.444 | 1.694 | 1.944 |
| 23 | 0.025 | 0.450 | 0.575 | 0.700 | 0.825 | 0.950 | 1.200 | 1.450 | 1.700 | 1.950 |
| 24 | 0.022 | 0.456 | 0.581 | 0.706 | 0.831 | 0.956 | 1.206 | 1.456 | 1.706 | 1.956 | tubesheet having a tube to be plugged, and to be slightly larger than bore 18. Insert member 14 includes a threaded shank 46, such as a threaded shaft extending from head 40 through tapered ferrule 42, that can extend inside and engage threaded bore 32. Although head 40 and shank 46 are show as separate structures from ferrule 42, the components could also be integrally formed as a single unit.

Rotation of head 40, and the locking of second cylindrical body 30 against rotation by eccentric assembly 34 in tube, will cause insert member 14 to advance into housing member 12 by the cooperation of threaded shank 46 and threaded bore 32. Advancement of insert member 14 causes ferrule 42 to engage wall 20 and then to deform wall 20 outwardly, thereby engaging the inner surface of a tubesheet aperture. Housing member 12 thus seals the aperture of the tubesheet while second cylindrical body 30 remains fixed within the tube associated with that aperture of tubesheet. As a result, the tube is fixed against movement and cannot sag, separate, or drop to interfere with or damage the other tubes connected to the tubesheet. Heat exchanger tube plug 10, when installed into compression against the tubesheet, creates a mechanical contact seal capable of withstanding up to 7,000 psi.

Figure 6:
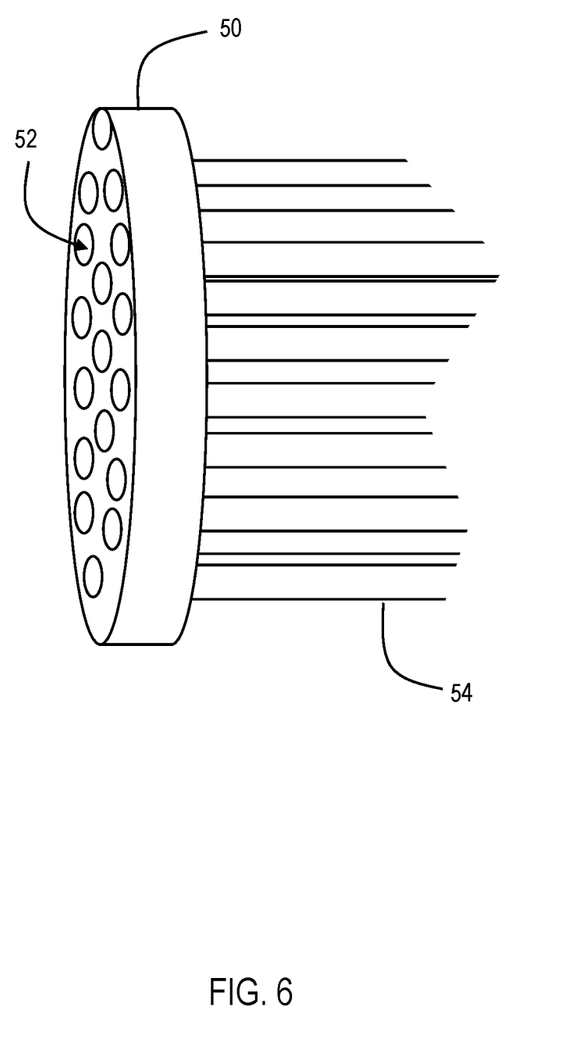
FIG. 6 is a schematic of a heat exchange tubesheet and tubes in need of repair.
Figure 7:
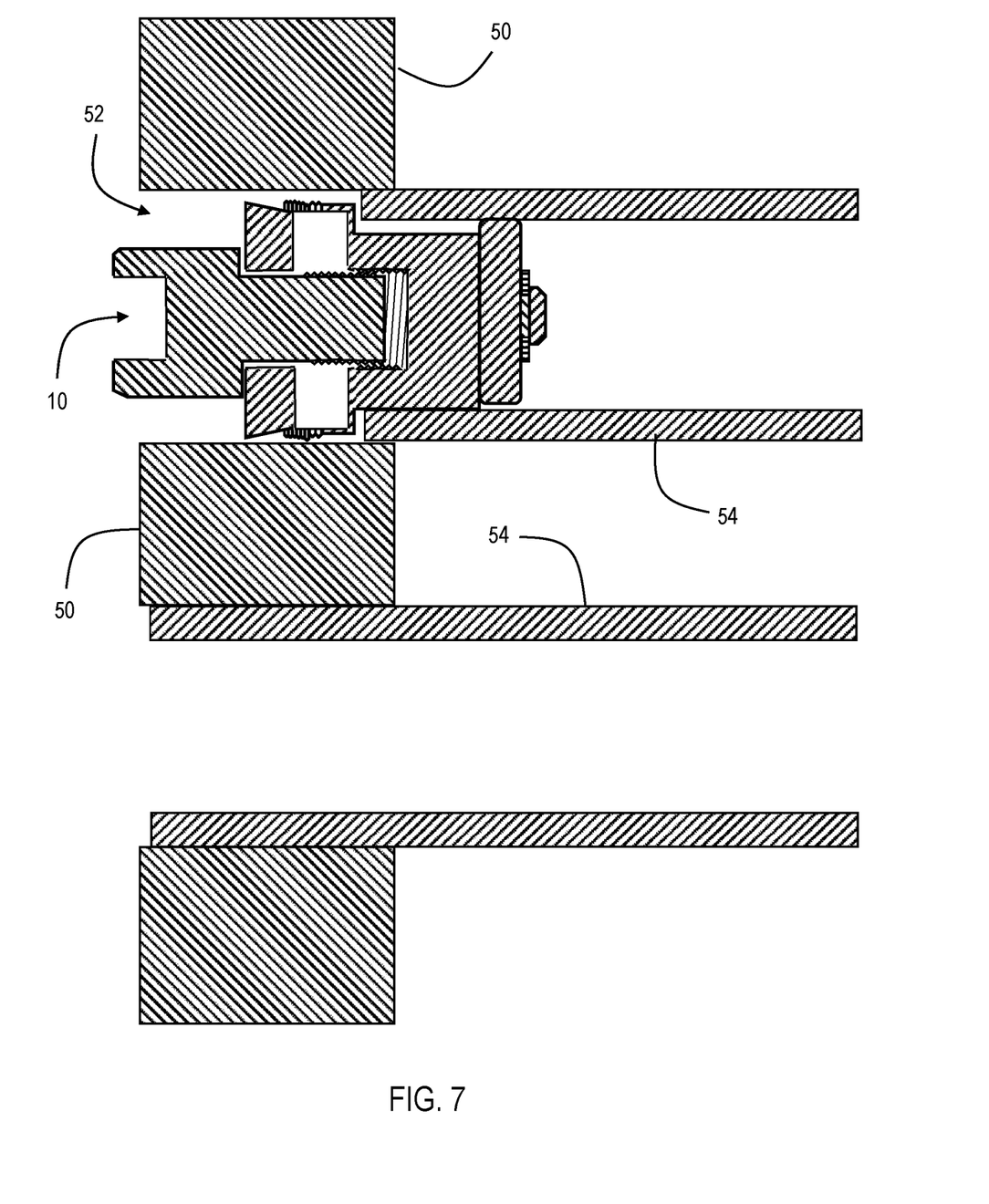
FIG. 7 is a schematic showing a heat exchanger tube plug according to the present invention installed in a tubesheet to plug the tube and support the tube against movement from its designed location in the tubesheet.

Tube plug 10 preferably expands approximately 30 mils (0.030") to provide a positive seal and thus first cylindrical body 16 can easily be dimensioned accordingly based on the inner dimensions of tubesheet aperture 52. Similarly, second cylindrical body 30 may be dimensioned to slide into the tube associated with the tubesheet aperture 52. For example, the outer diameter of first cylindrical body 16 is dictated by the size of tubesheet aperture 52, and the outer diameter of second cylindrical body 30 is dictated by the inside diameter of the tube 54 (which is typically the diameter of tubesheet aperture 52 less two times the thickness of the wall of tube 54 ). Tube 54 thicknesses can range significantly, with the various wall thicknesses from 10 to 24 BWG (boiler wall gauge). Plug 10 thus would have first cylindrical body 16 with an outer diameter of equal to the outside diameter of tube 54 (the outside diameter of tube 54 is very close to or Referring to FIG. 6, tube plug 10 may be used to plug the aperture 52 of a tubesheet 50 that is associated with a leaky or damaged tube 54 and also support tube 54 to prevent it becoming dislodged and damages adjacent tubes 54. If the tube damage is severe, or there is a crack in the tube, the tube ends may be drilled out and the tubesheet aperture 52 plugged directly with tube plug 10 without any concern that tube 54 will come loose and damage adjacent tubes. This approach avoids the need to disassembly the entire heat exchanger, as would be required to remove the tube, or to remove the surrounding tubes to avoid potential damage. The present invention is thus capable of effectively sealing a tube in high pressure situations due to the expansion of the mechanical sealing wall into the inner diameter surface of the tubesheet aperture. While tube plug 10 is designed for use in high pressure heat exchangers, the sealing system of the present invention may also be used in low pressure applications such as feedwater heaters, moisture separator reheaters, preheaters, condensers, coolers, fin-fan coolers or any other tubed heat exchanger where additional retention or sealing may be needed due to pitted or corroded inner diameter tube surface. Tube plug 10 may be made in any alloy or size for a desired application.

What is claimed is:

1. A method of sealing a heat exchanger having a tubesheet and a plurality of tubes coupled to the tubesheet, comprising the steps of:

positioning a heat exchanger tube plug in an aperture of a tubesheet so that a housing member of the heat exchanger tube plug has a first cylindrical body with a deformable wall of a first outer diameter positioned in the aperture and has a second cylindrical body extending from the first cylindrical body with a second outer diameter that is smaller than the first outer diameter that extends into and engages a tube of the tubesheet; and rotating an insert member of the heat exchanger tube plug relative to the housing member so that a threaded shank of the insert member engages an inner threaded bore of the second cylindrical body, thereby causing the insert member to advance into the housing member so that a ramped surface of the insert member deforms the deformable wall of the first cylindrical body outwardly into contact with the aperture of the tubesheet.

2. The method of claim 1, wherein the rotation of the insert member relative to the housing member causes an eccentric ring positioned on an end of the second cylindrical body of the housing member to engage the tube of the tubesheet and prevent rotation of the housing member while the insert member is being rotated.

3. The method of claim 2, wherein the insert member includes a driving recess allowing an external force to cause rotating of the insert member.

4. The method of claim 3, wherein the driving recess has a hexagonal geometry.

5. The method of claim 4, wherein the ramped surface of the insert member is formed integrally with the threaded shank.

6. The method of claim 4, wherein the ramped surface of the insert member is formed by a conical ferrule.

* * * * *